United States Patent
Fukaya

(10) Patent No.: US 10,567,595 B1
(45) Date of Patent: Feb. 18, 2020

(54) IMAGE FORMING APPARATUS AND CONTROL METHOD BY THE SAME

(71) Applicant: TOSHIBA TEC KABUSHIKI KAISHA, Shinagawa-ku, Tokyo (JP)

(72) Inventor: Hideaki Fukaya, Sunto (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/052,927

(22) Filed: Aug. 2, 2018

(51) Int. Cl.
*H04N 1/00* (2006.01)

(52) U.S. Cl.
CPC ..... *H04N 1/00034* (2013.01); *H04N 1/00084* (2013.01); *H04N 1/00978* (2013.01); *H04N 1/00992* (2013.01)

(58) Field of Classification Search
CPC .......... H04N 1/00034; H04N 1/00992; H04N 1/00978; H04N 1/00084
See application file for complete search history.

(56) References Cited

U.S. PATENT DOCUMENTS

| | | | | |
|---|---|---|---|---|
| 2009/0141306 A1* | 6/2009 | Yamada | ................ | B41J 29/393 358/1.15 |
| 2014/0185096 A1* | 7/2014 | Tokunaga | .......... | H04N 1/00976 358/1.15 |
| 2014/0293319 A1* | 10/2014 | Kielland | ................ | B41J 29/393 358/1.14 |
| 2016/0119486 A1* | 4/2016 | Matsuda | ............ | H04N 1/00015 382/112 |

FOREIGN PATENT DOCUMENTS

| | | |
|---|---|---|
| JP | 2014-142599 | 8/2014 |
| JP | 2015-225106 | 12/2015 |

* cited by examiner

*Primary Examiner* — Neil R McLean
(74) *Attorney, Agent, or Firm* — Amin, Turocy & Watson LLP

(57) ABSTRACT

In accordance with an embodiment, an image forming apparatus comprises a measurement section configured to measure first environmental information of a measurement position in a first period; an acquisition section configured to acquire first external environmental information measured by a first external device; and a controller configured to estimate second environmental information of the measurement position in a second period different from the first period using the first external environmental information, and perform control to execute a maintenance operation based on the second environmental information.

20 Claims, 4 Drawing Sheets

IMAGE FORMING APPARATUS AND CONTROL METHOD BY THE SAME

FIELD

Embodiments described herein relate generally to an image forming apparatus and a control method by the same.

BACKGROUND

In an image forming apparatus, if the environment such as temperature changes greatly, the probability of an occurrence of failure becomes high. For this reason, by arranging a sensor such as a thermometer in the image forming apparatus, an operation corresponding to the change in the environment is executed. However, if a power supply of the image forming apparatus is turned off, the sensor cannot perform measurement. In the meantime, if the environment changes greatly, the image forming apparatus cannot perform operations corresponding to the change in the environment.

DETAILED DESCRIPTION

Figure 1:
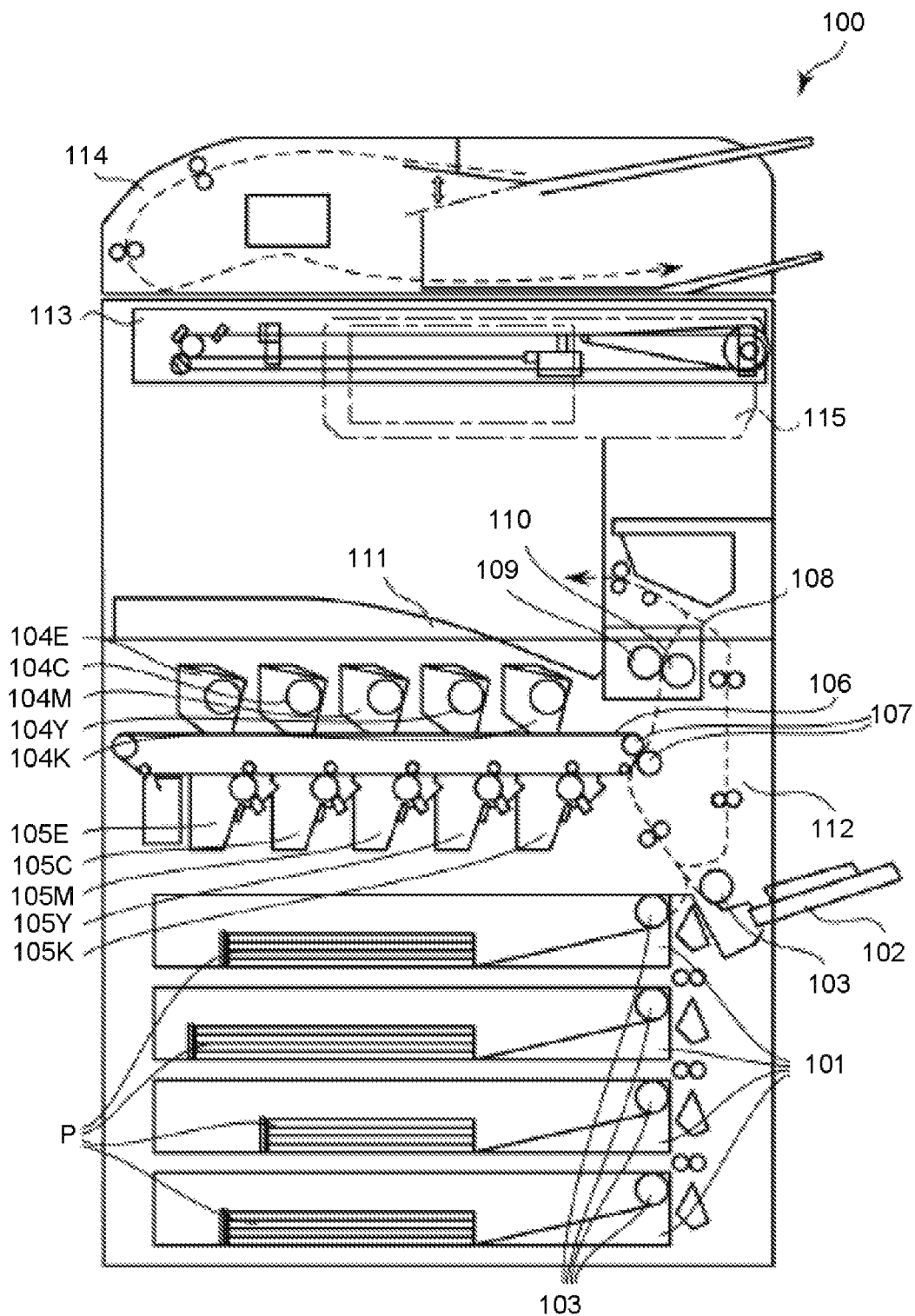
FIG. 1 is a diagram illustrating an example of an outline of an image forming apparatus according to an embodiment.

In accordance with an embodiment, an image forming apparatus comprises a measurement section configured to measure first environmental information of a measurement position in a first period; an acquisition section configured to acquire first external environmental information measured by a first external device; and a controller configured to estimate second environmental information of the measurement position in a second period different from the first period using the first external environmental information, and perform control to execute a maintenance operation based on the second environmental information.

Hereinafter, an image forming system including an image forming apparatus according to an embodiment is described with reference to the accompanying drawings. In the drawings used for the description of the embodiment below, there is a case in which the scale of each section is appropriately changed. In the drawings used in the description of the embodiment below, the configuration may be omitted for the sake of description.

An image forming apparatus 100 is described with reference to FIG. 1. FIG. 1 is a diagram illustrating an example of an outline of the image forming apparatus 100 according to the embodiment. The image forming apparatus 100 is, for example, an MFP (Multi-Function Peripheral), a copy machine, a printer, a facsimile, or the like. The image forming apparatus 100 has, for example, a printing function, a scanning function, a copying function, a decoloring function, a facsimile function, or the like. The printing function is a function of forming an image on an image forming medium P or the like using a recording material such as a toner. The image forming medium P is, for example, a sheet-like sheet. The printing function is implemented by, for example, a laser printer, an inkjet printer, or another type of the printer. As an example, the image forming apparatus 100 provided with a laser printer is shown in FIG. 1. The scanning function is a function of reading an image from a document or the like on which an image is formed. The copy function is a function of printing an image read out from the document or the like using the scanning function on the image forming medium P by using the printing function. The decoloring function is a function of decoloring an image formed with a decolorable recording material on the image forming medium P. As an example, the image forming apparatus 100 includes a sheet feed tray 101, a manual feed tray 102, a sheet feed roller 103, a toner cartridge 104, an image forming section 105, a transfer belt 106, a transfer roller 107, a fixing section 108, a heating roller 109, a pressure roller 110, a sheet discharge tray 111, a duplex printing unit 112, a scanning section 113, an automatic document feeder 114, and a control panel 115.

The sheet feed tray 101 accommodates the image forming medium P used for printing.

The manual feed tray 102 is a table for manually feeding the image forming medium P.

The sheet feed roller 103 rotates by the operation of the motor 131 to convey the image forming medium P accommodated in the sheet feed tray 101 or the manual feed tray 102 out from the sheet feed tray 101 or the manual feed tray 102.

The toner cartridge 104 stores a recording material such as toner to be supplied to the image forming section 105. The image forming apparatus 100 comprises one or more toner cartridges 104. As an example, as shown in FIG. 1, the image forming apparatus 100 includes five different toner cartridges 104, i.e., a toner cartridge 104E, a toner cartridge 104C, a toner cartridge 104M, a toner cartridge 104Y, and a toner cartridge 104K. The toner cartridge 104C, the toner cartridge 104M, the toner cartridge 104Y, and the toner cartridge 104K store recording material corresponding to respective colors of CMYK (cyan, magenta, yellow, and key (black)), respectively. The toner cartridge 104E stores a decolorable recording material which is decolored at a temperature higher than a predetermined temperature to become invisible. The color and type of the recording material accommodated in the toner cartridge 104 are not limited to those described here.

The image forming section 105 includes a photoconductive drum and a developing device. The developing device develops an electrostatic latent image on the photoconductive drum using the recording material supplied from the toner cartridge 104. Thereby, an image is formed on the photoconductive drum. The image formed on the photoconductive drum is transferred onto the transfer belt 106. The image forming apparatus 100 includes one or more image forming sections 105. For example, as shown in FIG. 1, the image forming apparatus 100 includes five image forming sections 105, i.e., an image forming section 105E, an image forming section 105C, an image forming section 105M, an image forming section 105Y, and an image forming section 105K. The image forming section 105C, the image forming section 105M, the image forming section 105Y, and the image forming section 105K form images with recording material corresponding to the respective colors of CMYK, respectively. The image forming section 105E forms an image with the decolorable recording material.

The transfer belt 106 is, for example, an endless belt, and is rotatable by the operation of a roller. The transfer belt 106 rotates to convey the image transferred from each image forming section to the position of the transfer roller 107.

The transfer roller 107 includes two rollers facing each other. The transfer roller 107 transfers the image formed on the transfer belt 106 onto the image forming medium P passing through the transfer roller 107.

The fixing section 108 heats and pressurizes the image forming medium P onto which the image is transferred. As a result, the image transferred onto the image forming medium P is fixed. The fixing section 108 includes a heating roller 109 and a pressure roller 110 facing each other.

The heating roller 109 has a heat source for heating the heating roller 109. The heat source is, for example, a heater such as a halogen heater.

The pressure roller 110 pressurizes the image forming medium P passing between the pressure roller 110 and the heating roller 109.

The sheet discharge tray 111 is a table onto which the image forming medium P on which the printing is completed is discharged.

The duplex printing unit 112 sets the image forming medium P to a state in which the printing on a back surface thereof is enabled. For example, the duplex printing unit 112 reverses the front and back surfaces of the image forming medium P by switching the image forming medium P back using a roller or the like.

The scanning section 113 reads an image from a document. The scanning section 113 includes a scanner for reading an image from the document.

The scanner is a scanner of an optical reduction system including an image capturing element such as a CCD (Charge-Coupled Device) image sensor, for example. Alternatively, the scanner may be a scanner of a CIS (Contact Image Sensor) system including an image capturing element such as a CMOS (Complementary Metal-Oxide-Semiconductor) image sensor. The scanner may be a scanner of another known system.

The automatic document feeder 114 is also referred to as an ADF (Auto Document Feeder), for example. The automatic document feeder 114 sequentially conveys documents placed on a document tray. The conveyed document is scanned by the scanning section 113, and thus the image thereon is read. The automatic document feeder 114 may be provided with a scanner for reading an image from the back surface of the document. The automatic document feeder 114 includes a roller and a motor for conveying the document.

The control panel 115 includes buttons and a touch panel for an operator of the image forming apparatus 100 to operate. For example, a display such as a liquid crystal display or an organic EL (Electro-Luminescence) display and a pointing device such as a touch pad are superimposed to form the touch panel. Therefore, the buttons and the touch panel function as an input device for receiving an operation by the operator of the image forming apparatus 100. The display of the touch panel functions as a display device for notifying the operator of the image forming apparatus 100 of various information.

Figure 2:
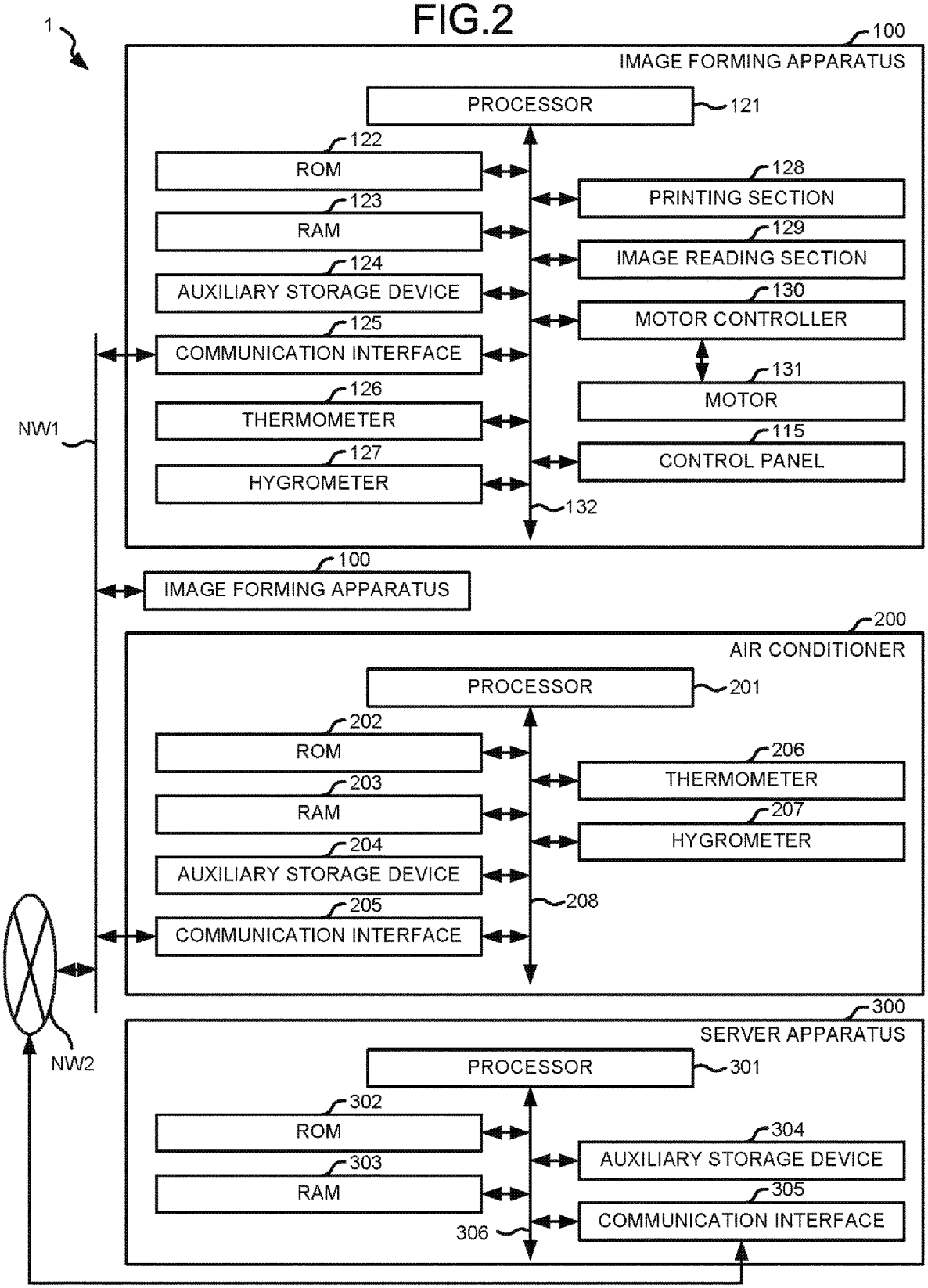
FIG. 2 is a block diagram illustrating a circuit configuration of main portions of an image forming system and the image forming apparatus included in the image forming system according to the embodiment.

An image forming system 1 including the image forming apparatus 100 is described with reference to FIG. 2. FIG. 2 is a block diagram illustrating a circuit configuration of main portions of the image forming apparatus 100 included in the image forming system 1 and the image forming system 1.

For example, the image forming system 1 includes the image forming apparatus 100, an air conditioner 200 and a server apparatus 300. Although two image forming apparatuses 100, one air conditioner 200 and one server apparatus 300 are shown in FIG. 2, the number thereof is not limited thereto.

The image forming apparatus 100 and the air conditioner 200 are connected to a network NW1. The network NW1 may be typically a communication network including a private network such as an intranet. The network NW1 may be typically a communication network including a LAN (Local Area Network). The network NW1 may be a wireless line or a wired line, or a combination of the wireless line and the wired line.

The network NW1 and the server apparatus 300 are connected to a network NW2. The network NW2 may be typically a communication network including the Internet. The network NW2 may be typically a communication network including a WAN (Wide Area Network). The network NW2 may be a wireless line or a wired line, and a combination of the wireless line and the wired line.

The image forming apparatus 100 may be directly connected to the network NW2 without using the network NW1. The air conditioner 200 may be directly connected to the network NW2 without using the network NW1. The server apparatus 300 may be directly connected to the network NW1 without using the network NW2.

For example, the image forming apparatus 100 includes a processor 121, a ROM (Read-Only Memory) 122, a RAM (Random Access Memory) 123, an auxiliary storage device 124, a communication interface 125, a thermometer 126, a hygrometer 127, a printing section 128, an image reading section 129, a motor controller 130, and a control panel 115. These components are connected with each other through a bus 132 or the like.

The processor 121 acts as a central part of a computer which performs processing such as an arithmetic processing and a control processing necessary for the operation of the image forming apparatus 100. The processor 121 executes programs such as a system software, an application software or a firmware stored in the ROM 122 or the auxiliary storage device 124 to control each section to realize various functions of the image forming apparatus 100. The processor 121 may be, for example, a CPU (Central Processing Unit), a MPU (Micro Processing Unit), a SoC (System on a Chip), a DSP (Digital Signal Processor), a GPU (Graphics Processing Unit), an ASIC (Application Specific Integrated Circuit), a PLD (Programmable Logic Device) or a FPGA (Field-Programmable Gate Array). Alternatively, the processor 121 may be a combination of plural ones among the above.

The ROM 122 acts as a main storage device of the computer with the processor 121 as the central part. The ROM 122 is a nonvolatile memory exclusively used for reading out data therefrom. The ROM 122 stores the above program. The ROM 122 stores data used for various processing performed by the processor 121, various setting values, or the like.

The RAM 123 acts as a main storage device of the computer with the processor 121 as the central part. The RAM 123 is a memory used for reading and writing data. The RAM 123 is used as a so-called work area for storing data temporarily used for the various processing performed by the processor 121.

The auxiliary storage device 124 acts as an auxiliary storage device of the computer with the processor 121 as the central part. The auxiliary storage device 124 is, for example, an EEPROM (Electric Erasable Programmable Read-Only Memory), a HDD (Hard Disk Drive), a SSD (Solid State Drive), or the like. The auxiliary storage device 124 may store the above programs. The auxiliary storage device 124 stores data used for various processing performed by the processor 121, data generated by processing by the processor 121, or various setting values. The image forming apparatus 100 may be provided with an interface into which a storage medium such as a memory card or a USB (Universal Serial Bus) memory can be inserted in addition to or in place of the auxiliary storage device 124.

The programs stored in the ROM 122 or the auxiliary storage device 124 include a program for executing processing described later. As an example, the image forming apparatus 100 is transferred to an administrator or the like of the image forming apparatus 100 with the program stored in the ROM 122 or the auxiliary storage device 124. However, the image forming apparatus 100 may be transferred to the administrator or the like in a state in which the program is not stored in the ROM 122 or the auxiliary storage device 124. The image forming apparatus 100 may be transferred to the administrator or the like with another program different from the above program stored in the ROM 122 or the auxiliary storage device 124. Then, the program for executing the processing described later may be separately transferred to the administrator or the like, and may be written into the ROM 122 or the auxiliary storage device 124 under the operation of the administrator or a service person. The transfer of the program at this time may be realized by recording the program on a removable storage medium such as a magnetic disk, a magneto-optical disk, an optical disk, a semiconductor memory or the like, or by downloading the program via the network NW1 and the network NW2.

The communication interface 125 is used by the image forming apparatus 100 to perform communicate via the network.

The thermometer 126 is, for example, a sensor for measuring the air temperature of the outside of the image forming apparatus 100. Alternatively, the thermometer 126 may measure the temperature of the inside of a housing of the image forming apparatus 100. The thermometer 126 outputs the measured temperature. The processor 121 can acquire the temperature output from the thermometer 126. The temperature is an example of environmental information. The thermometer 126 is an example of a measurement section that measures the temperature at a measurement position. The thermometer 126 is an example of a first measurement section and a second measurement section.

The hygrometer 127 is, for example, a sensor for measuring the humidity of the outside of the image forming apparatus 100. Alternatively, the hygrometer 127 may measure the humidity of the inside of the housing of the image forming apparatus 100. The hygrometer 127 outputs the measured humidity. The processor 121 can acquire the humidity output from the hygrometer 127. The humidity is an example of the environmental information. The hygrometer 127 is an example of the measurement section that measures the humidity of the measurement position. The hygrometer 127 is an example of the first measurement section and the second measurement section.

The image forming apparatus 100 may be provided with a sensor for measuring the environmental information other than the temperature and the humidity. For example, the image forming apparatus 100 may include a barometer that measures atmospheric pressure as the environmental information. For example, the image forming apparatus 100 may include a photometer, a luminometer, a luminance meter, an integrating photometer or the like for respectively measuring luminous intensity, illuminance, brightness, luminous flux or the like as the environmental information.

The printing section 128 prints an image on the image forming medium P by forming an image using toner, ink, or the like on the image forming medium P. The printing section 128 includes, for example, a laser printer, an inkjet printer, or a printer of another system. The printing section 128 includes, for example, the toner cartridge 104, the image forming section 105, the transfer belt 106, the transfer roller 107, the fixing section 108, the duplex printing unit 112, and the like.

The image reading section 129 reads an image from a document. The image reading section 129 includes a scanner for reading an image from the document. The image reading section 129 includes, for example, a scanning section 113 and the automatic document feeder 114.

The scanner is, for example, a scanner of an optical reduction system including an image capturing element such as a CCD image sensor. Alternatively, the scanner may be a scanner of a CIS system including an image capturing element such as the CMOS image sensor. Alternatively, the scanner may be a scanner of another known system.

The motor controller 130 controls the motor 131 under the control of the processor 121.

The motor 131 drives each section of the image forming apparatus 100. For example, the motor 131 drives the sheet feed roller 103, the automatic document feeder 114, or the like. The motor 131 may be a single motor or a motor group including a plurality of motors. The image forming apparatus 100 may have only one motor 131 or a plurality of motors 131.

The bus 132 includes a control bus, an address bus, a data bus, and the like, and transmits a signal transmitted and received among respective sections of the image forming apparatus 100.

The air conditioner 200 is, for example, an air conditioner or the like. Alternatively, the air conditioner 200 may be a management system, a control system, or the like in a building or a house. The air conditioner 200 includes, for example, a processor 201, a ROM 202, a RAM 203, an auxiliary storage device 204, a communication interface 205, a thermometer 206, and a hygrometer 207. These components are connected with each other by a bus 208 or the like.

The processor 201 acts as a central part of a computer which performs processing such as an arithmetic processing and a control processing necessary for the operation of the air conditioner 200. The processor 201 executes programs such as a system software, an application software or a firmware stored in the ROM 202 or the auxiliary storage device 204 to control each section to realize various functions of the air conditioner 200. The processor 201 may be, for example, a CPU, a MPU, a SoC, a DSP, a GPU, an ASIC, a PLD or a FPGA. Alternatively, the processor 121 may be a combination of plural ones among the above.

The ROM 202 acts as a main storage device of the computer with the processor 201 as the central part. The ROM 202 is a nonvolatile memory exclusively used for reading out data therefrom. The ROM 202 stores the above programs. The ROM 202 stores data used for various processing performed by the processor 201, various setting values, or the like.

The RAM 203 acts as a main storage device of the computer with the processor 201 as the central part. The RAM 203 is a memory used for reading and writing data.

The RAM 203 is used as a so-called work area for storing data temporarily used for various processing performed by the processor 201.

The auxiliary storage device 204 acts as an auxiliary storage device of the computer with the processor 201 as the central part. The auxiliary storage device 204 is, for example, an EEPROM, a HDD, a SSD, or the like. The auxiliary storage device 204 may store the above programs. The auxiliary storage device 204 stores data used for various processing performed by the processor 201, data generated in processing by the processor 201, or various setting values. The auxiliary storage device 204 stores the temperature measured by the thermometer 206, the humidity measured by the hygrometer 207 in association with date and time when the measurement is performed.

The program stored in the ROM 202 or the auxiliary storage device 204 includes a program for executing processing described later. As an example, the air conditioner 200 is transferred to an administrator or the like of the air conditioner 200 with the program stored in the ROM 202 or the auxiliary storage device 204. However, the air conditioner 200 may be transferred to the administrator or the like in a state in which the program is not stored in the ROM 202 or the auxiliary storage device 204. The air conditioner 200 may be transferred to the administrator or the like with another program different from the above program stored in the ROM 202 or the auxiliary storage device 204. Then, the program for executing the processing described later may be separately transferred to the administrator or the like, and may be written into the ROM 202 or the auxiliary storage device 204 under the operation of the administrator or a service person. The transfer of the program at this time may be realized by recording the program on a removable storage medium such as a magnetic disk, a magneto-optical disk, an optical disk, a semiconductor memory or the like, or by downloading the program via the network NW1 and the network NW2.

The communication interface 205 is used by the air conditioner 200 to perform communication through the network NW1.

The thermometer 206 measures an air temperature in a room in which the air conditioner 200 is installed. Then, the thermometer 206 outputs the measured temperature.

The hygrometer 207 measures the humidity in a room in which the air conditioner 200 is installed. Then, the hygrometer 207 outputs the measured humidity.

The bus 208 includes a control bus, an address bus, a data bus, and the like, and transmits a signal transmitted and received between respective sections of the air conditioner 200.

The server apparatus 300 distributes measured values for each period for the environmental information such as the air temperature and the humidity in each area. The server apparatus 300 includes, for example, a processor 301, a ROM 302, a RAM 303, an auxiliary storage device 304, and a communication interface 305. These components are connected with each other via a bus 306 or the like.

The processor 301 acts as a central part of a computer which performs processing such as an arithmetic processing and a control processing necessary for the operation of the server apparatus 300. The processor 301 executes programs such as a system software, an application software or a firmware stored in the ROM 302 or the auxiliary storage device 304 to control each section to realize various functions of the server apparatus 300. The processor 301 is, for example, a CPU, a MPU, a SoC, a DSP, a GPU, an ASIC, a PLD or a FPGA. Alternatively, the processor 301 may be a combination of plural ones among the above.

The ROM 302 acts as a main storage device of the computer with the processor 301 as the central part. The ROM 302 is a nonvolatile memory exclusively used for reading out data therefrom. The ROM 302 stores the above programs. The ROM 302 stores data used for various processing performed by the processor 301, various setting values, or the like.

The RAM 303 acts as a main storage device of the computer with the processor 301 as the central part. The RAM 303 is a memory used for reading and writing data. The RAM 303 is used as a so-called work area for storing data temporarily used for various processing performed by the processor 301.

The auxiliary storage device 304 acts as an auxiliary storage device of the computer with the processor 301 as the central part. The auxiliary storage device 304 is, for example, an EEPROM, a HDD, a SSD, or the like. The auxiliary storage device 304 may store the above programs in some cases. The auxiliary storage device 304 stores data used for various processing performed by the processor 301, data generated in the processing by the processor 301, or various setting values. The auxiliary storage device 304 stores measured values of the environmental information such as the air temperature and the humidity in each area in association with a time when the measurement is performed. The measured values are measured by the thermometer, the hygrometer, or various sensors installed in a meteorological observatory in each area.

The program stored in the ROM 302 or the auxiliary storage device 304 includes a program for executing processing described later. For example, the server apparatus 300 is transferred to an administrator or the like of the server apparatus 300 with the program stored in the ROM 302 or the auxiliary storage device 304. However, the server apparatus 300 may be transferred to the administrator or the like in a state in which the program is not stored in the ROM 302 or the auxiliary storage device 304. The server apparatus 300 may be transferred to the administrator or the like with another program different from the above program stored in the ROM 302 or the auxiliary storage device 304. Then, the program for executing the processing described later may be separately transferred to the administrator or the like, and may be written into the ROM 302 or the auxiliary storage device 304 under the operation of the administrator or a service person. The transfer of the program at this time may be realized by recording the program on a removable storage medium such as a magnetic disk, a magneto-optical disk, an optical disk, a semiconductor memory or the like, or by downloading the program via the network NW2.

The communication section 305 is used by the server apparatus 300 to perform communication via the network NW1.

The bus 306 includes a control bus, an address bus, a data bus, and the like, and transmits a signal transmitted and received between respective sections of the server apparatus 300.

Figure 3:
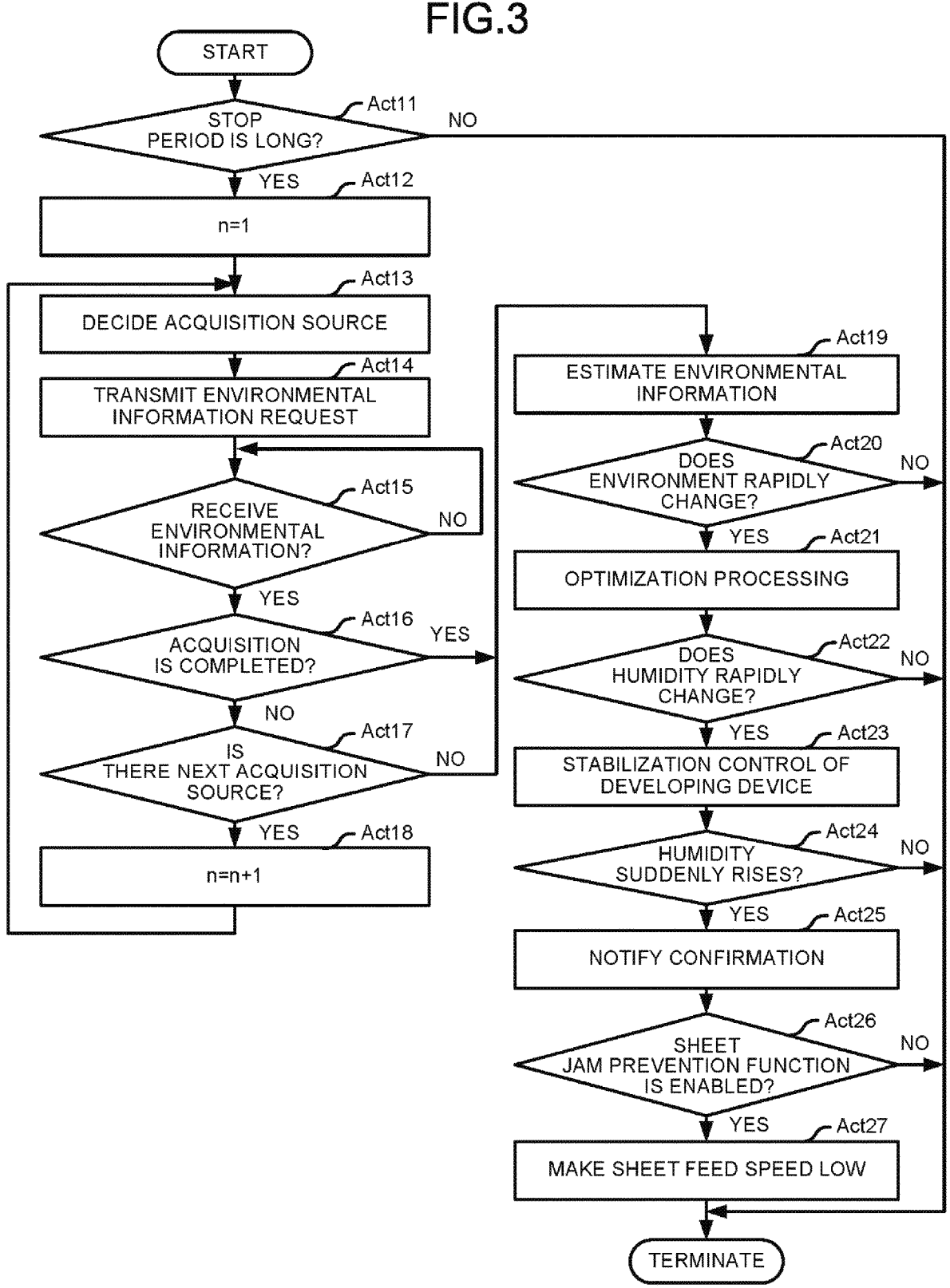
FIG. 3 is a flowchart depicting a processing by a processor shown in FIG. 2 according to the embodiment.

Hereinafter, the operation of the image forming system 1 according to the embodiment is described with reference to FIG. 3. The contents of the processing in the following operation description are merely an example, and various processing capable of achieving the same result can be properly used. FIG. 3 is a flowchart depicting a processing by the processor 121 of the image forming apparatus 100. The processor 121 executes the processing by executing the program stored in the ROM 122 or the auxiliary storage device 124. When the processor 121 proceeds to the processing in Act (N+1) after processing in Act N (N is a natural number), the detailed description for describing the above procedure may be omitted.

The image forming apparatus 100 can operate in a mode called a sleep mode or the like. For example, the image forming apparatus 100 shifts to the sleep mode when there is no input of operation or communication in a certain period of time elapses. The image forming apparatus 100 in the sleep mode reduces the power consumption by stopping the operation of each section. For example, the image forming apparatus 100 in the sleep mode stops operations of the thermometer 126 and the hygrometer 127. When the operation on an operation panel 150 or the communication to the communication interface 125 is performed in the sleep mode, the image forming apparatus 100 cancels the sleep mode and shifts to a normal operation mode.

The processor 121 of the image forming apparatus 100 starts the processing shown in FIG. 3 in response to the cancellation from the sleep mode in the image forming apparatus 100. The processor 121 also starts the processing shown in FIG. 3 even when the image forming apparatus 100 is switched from a power OFF state to a power ON state. In the following description, one image forming apparatus 100 executing the processing shown in FIG. 3 is referred to as an image forming apparatus 100A, and the other image forming apparatus 100 is referred to as an image forming apparatus 100B. The image forming apparatus 100B is an example of another image forming apparatus. The environmental information measured by the image forming apparatus 100A is an example of first environmental information. The environmental information measured by the image forming apparatus 100B is an example of second environmental information.

In Act 11 in FIG. 3, the processor 121 of the image forming apparatus 100A determines whether or not a length of a period from a moment when the image forming apparatus 100A shifts to the sleep mode to a moment when the sleep mode is canceled or a length of a period from a moment when a power supply of the image forming apparatus 100A is turned on to a moment when the power supply is turned on again is equal to or longer than a predetermined length. The state in which the image forming apparatus 100 is in the power OFF state or in the sleep mode is referred to as an operation stop state. The "period from a moment when the image forming apparatus 100A shifts to the operation stop state to a moment when the operation stop state is canceled" is hereinafter referred to as a "stop period". A period that is not the stop period, i.e., a period during which the thermometer 126 and the hygrometer 127 are operating is an example of a first period. The stop period, i.e., the period during which the thermometer 126 and the hygrometer 127 do not operate is an example of a second period.

If the length of the stop period is less than the predetermined length, the processor 121 determines No in Act 11 and terminates the processing shown in FIG. 3. On the other hand, if the length of the stop period is equal to or longer than the predetermined length, the processor 121 determines Yes in Act 11 and proceeds to the processing in Act 12.

In Act 12, the processor 121 sets a value of a variable n to 1.

In Act 13, the processor 121 decides an acquisition source of the environmental information to acquire the environmental information such as the temperature and the humidity in the stop period. The acquisition source is decided from, for example, acquisition source candidates stored in the auxiliary storage device 124 in a state in which a priority thereof is determined. For example, the priority of the acquisition source candidates is set as follows. In other words, a priority order of an acquisition source candidate having the highest priority is set to 1, and the following priority orders are 2, 3, 4, . . . in a descending order of the priority. The processor 121 decides the acquisition source candidate having the priority n as an acquisition source of the temperature and the humidity.

It is preferable that the closer a physical distance from the image forming apparatus 100A is, the higher the priority is. Alternatively, it is preferable that the smaller the number of networks through which the acquisition source candidate communicates with the image forming apparatus 100A is, the higher the priority is. Here, "the smaller the number of networks is" means, for example, that the number of devices such as routers and hubs interposed therebetween is small. "The smaller the number of networks is" may mean that a response period of time such as RTT (Round Trip Time) is short. For example, the priority may be automatically decided by the image forming apparatus 100A measuring the RTT. The priority may be arbitrarily set by the administrator of the image forming apparatus 100A. In addition, for example, the setting of an address of the acquisition source candidate is also made by the administrator of the image forming apparatus 100A. It is considered that the image forming apparatus 100B set as the acquisition source candidate is preferably installed in the same building as the image forming apparatus 100A, more preferably installed in the same floor, and most preferably installed in the same room. It is considered that the air conditioner 200 set as the acquisition source candidate is preferably installed in the same building as the image forming apparatus 100A, more preferably installed in the same floor, and most preferably installed in the same room. As described above, on a setting screen for setting the acquisition source candidate, for example, it is preferable to display a message indicating that installation locations of the image forming apparatus 100B and the air conditioner 200 to be set as the acquisition source candidates are preferably installed in the same building, more preferably installed in the same floor, and most preferably installed in the same room.

The acquisition source is, for example, the image forming apparatus 100B, the air conditioner 200, and the server apparatus 300. When those are arranged in the descending order of priority, for example, the image forming apparatus 100B, the air conditioner 200, and the server apparatus 300 are shown. The air conditioner 200 may have a higher priority than the image forming apparatus 100B in some cases. Since two or more the image forming apparatuses 100B may be provided, in that case, there may be both an image forming apparatus 100B having the higher priority than the air conditioner 200 and an image forming apparatus 100B having the lower priority.

In the following description, for example, it is assumed that the priority of the image forming apparatus 100B is 1, the priority of the air conditioner 200 is 2, and the priority of the server apparatus 300 is 3, and there is no apparatus having the priority of 4 or lower.

If there is a device having a priority x1 and a device having a priority x2, and the priority x1 is higher than the priority x2, the device having the priority x1 is an example of a first external device. The device having the priority x2 is an example of a second external device. x1 and x2 are arbitrary numbers.

In Act 14, the processor 121 generates an environmental information request. The environmental information request includes period information indicating a period. The environmental information request instructs to transmit the environmental information in the period indicated by the period information. The period indicated by the period information is, for example, the stop period. For example, if the stop period of the image forming apparatus 100A is from 20:30 on July 1st to 08:00 on July 2nd, the period information also indicates a period from 20:30 on July 1st to 08:00 on July 2nd. Before the start of the stop period and after the end of the stop period, the thermometer 126 and the hygrometer 127 in the image forming apparatus 100 can measure the environmental information. Therefore, immediately after the start of the stop period and immediately before the end of the stop period, the environmental information may not be necessarily acquired from the apparatus other than the image forming apparatus 100A. Therefore, the period information may indicate a period after a certain period of time since the start of the stop period and before a certain period of time after the end of the stop period. Alternatively, for the purpose of increasing the estimation accuracy described later, the stop period may include a period during which the image forming apparatus 100A is not in the stop state. The environmental information transmitted to the server apparatus 300 includes an address of the location where the image forming apparatus 100A is installed. The address is input to the image forming apparatus 100A in advance, for example, by the administrator of the image forming apparatus 100A or the like. After generating the environmental information request, the processor 121 instructs the communication interface 125 to transmit the environmental information request to the acquisition source decided in Act 13. Upon receiving this instruction, the communication interface 125 transmits the environmental information request to the acquisition source. The transmitted environmental information request is received by the acquisition source. When the acquisition source is the image forming apparatus 100B, the environmental information request is received by the communication interface 125 of the image forming apparatus 100B. When the acquisition source is the air conditioner 200, the environmental information request is received by the communication interface 205. When the acquisition source is the server apparatus 300, the environmental information request is received by the communication interface 305.

The processor 121 of the image forming apparatus 100B receiving the environmental information request instructs the communication interface 125 to transmit the environmental information during the period indicated by the period information contained in the environmental information request. Upon receiving the instruction, the communication interface 125 transmits the environmental information to the image forming apparatus 100A.

The processor 201 of the air conditioner 200 receiving the environmental information request instructs the communication interface 205 to transmit the environmental information during the period indicated by the period information contained in the environmental information request. Upon receiving the instruction, the communication interface 205 transmits the environmental information to the image forming apparatus 100A. At this time, the air conditioner 200 may also transmit a setting temperature and a setting humidity of the air conditioning.

The processor 301 of the server apparatus 300 receiving the environmental information request instructs the communication interface 305 to transmit the environmental information during the period indicated by the period information contained in the environmental information request. Upon receiving the instruction, the communication interface 305 transmits the environmental information to the image forming apparatus 100A.

If the image forming apparatus 100B, the air conditioner 200 or the server apparatus 300 stores the environmental information corresponding to only a part of the period indicated by the period information, the environmental information in the part of the period is transmitted to the image forming apparatus 100A. If the image forming apparatus 100B, the air conditioner 200 or the server apparatus 300 does not store the environmental information corresponding to the entire period indicated by the period information, information indicating that the environmental information cannot be transmitted is transmitted to the image forming apparatus 100A instead of the environmental information.

The environmental information transmitted from the image forming apparatus 100B, the air conditioner 200 or the server apparatus 300 is received by the communication interface 125 of the image forming apparatus 100A.

In Act 15, the processor 121 stands by until the environmental information is received by the communication interface 125. If the environmental information is received, the processor 121 determines Yes in Act 15 and proceeds to the processing in Act 16. When the information indicating that the environmental information cannot be transmitted is received instead of the environmental information, the processor 121 also determines Yes in Act 15 and proceeds to the processing in Act 16.

The environmental information received by the communication interface 125 is acquired by the processor 121. The environmental information is an example of external environmental information. As described above, the processor 121 operates as an acquisition section for acquiring the external environmental information in cooperation with the communication interface 125 by executing the processing in Act 14 and Act 15. The environmental information acquired from the first external device is an example of first external environmental information. Furthermore, the environmental information acquired from the second external device is an example of second external environmental information.

In Act 16, the processor 121 determines whether or not the environmental information sufficient to estimate the environmental information in the stop period is acquired. In other words, for example, the processor 121 determines whether or not the environmental information corresponding to the entire stop period is acquired. For example, if the processor 121 can acquire the environmental information in each certain period of time in the stop period, the processor 121 determines that the environmental information corresponding to the entire stop period is acquired. Alternatively, if the length of a period in which the environmental information cannot be acquired in the stop period is equal to or shorter than the length of a certain period of time, the processor 121 determines that the environmental information corresponding to the entire stop period is acquired. If it is determined that the environmental information sufficient to estimate the environmental information in the stop period cannot be acquired, the processor 121 determines No in Act 16 and proceeds to the processing in Act 17.

In Act 17, the processor 121 determines whether or not there is an acquisition source whose priority is lower than that of the acquisition source determined in Act 13. In other words, the processor 121 determines whether or not there is an acquisition source whose priority is (n+1). If there is the acquisition source whose priority is (n+1), the processor 121 determines Yes in Act 17 and proceeds to the processing in Act 18.

In Act 18, the processor 121 increments the value of the variable n by 1. After the processing in Act 18, the processor 121 returns to the processing in Act 13.

As described above, the processor 121 repeats the processing in Act 13 to Act 18 until it is determined that the environmental information corresponding to the entire stop period is acquired, or there is no more acquisition source from which the environmental information is acquired.

If it is determined that the environmental information sufficient to estimate the environmental information in the stop period cannot be acquired, the processor 121 determines Yes in Act 16 and proceeds to the processing in Act 19. If there is no acquisition source whose priority is (n+1), the processor 121 determines No in Act 17 and proceeds to the processing in Act 19.

The environmental information acquired by the above processing is shown in Table 1 as an example. Table 1 shows an example of the acquired environmental information. The environmental information shown in Table 1 includes not only the temperature and the humidity but also atmospheric pressure. The atmospheric pressure is an example of the environmental information.

TABLE 1

| DATE AND TIME | STATE OF APPARATUS | TEMPERATURE | HUMIDITY | ATMOSPHERIC PRESSURE | ESTIMATION SOURCE DATA |
|---|---|---|---|---|---|
| 08:00 ON JULY 1ST | POWER ON | 28° C. | 70% | 1000 hPa | NONE (DETECTED BY ITSELF) |
| 12:00 ON JULY 1ST | WARM-UP MODE | 25° C. | 60% | 990 hPa | NONE (DETECTED BY ITSELF) |
| 20:30 ON JULY 1ST | SLEEP MODE | 25° C. | 50% | 990 hPa | NONE (DETECTED BY ITSELF) |
| 21:00 ON JULY 1ST | POWER OFF | 25° C. | 40% | 995 hPa | AIR CONDITIONER (OPERATING) |
| 22:00 ON JULY 1ST | POWER OFF | 25° C. | 40% | 985 hPa | AIR CONDITIONER (OPERATING) |
| 23:00 ON JULY 1ST | POWER OFF | 26° C. | 65% | 995 hPa | IMAGE FORMING APPARATUS NEARBY |
| 04:00 ON JULY 2ND | POWER OFF | 30° C. | 80% | 970 hPa | AIR CONDITIONER (NON-OPERATING) |
| 05:00 ON JULY 2ND | POWER OFF | 32° C. | 80% | 970 hPa | INSTALLATION AREA INFORMATION (THROUGH INTERNET) |
| 06:00 ON JULY 2ND | POWER OFF | 31° C. | 85% | 970 hPa | IMAGE FORMING APPARATUS NEARBY |
| 08:00 ON JULY 2ND | POWER ON | 26° C. | 50% | 995 hPa | NONE (DETECTED BY ITSELF) |

Table 1 shows, for example, the following cases.

The environmental information at 20:30 on July 1st is measured by the sensors such as the thermometer 126 and the hygrometer 127 of the image forming apparatus 100A when the image forming apparatus 100A shifts to the sleep mode. The environmental information before that also measured by the sensors such as the thermometer 126 and the hygrometer 127 of the image forming apparatus 100A.

Since the environmental information at 21:00 and 22:00 on July 1st and 04:00 on July 2nd cannot be acquired from the image forming apparatus 100B whose priority is 1, the environmental information is acquired from the air conditioner (air conditioner 200) whose priority is 2.

The environmental information at 23:00 on July 1st and 06:00 on July 2nd is acquired from the image forming apparatus 100B whose priority is 1.

Since the environmental information at 05:00 on July 2nd cannot be acquired from the image forming apparatus 100B whose priority is 1 and the air conditioner whose priority is 2, the environmental information is acquired from the server apparatus whose priority is 3.

The environmental information from 21:00 on July 1st to 07:00 on July 2th is acquired by executing the processing shown in FIG. 3 by the image forming apparatus 100A which terminates the stop period through turning on the power supply thereof at 08:00 on July 2th. The environmental information at 08:00 on July 2th is measured by the sensors such as the thermometer 126 and the hygrometer 127 provided in the image forming apparatus 100A.

In Table 1, when the environmental information can be acquired from a plurality of apparatuses, the environmental information acquired from the apparatus with the highest priority is shown.

In Act 19, the processor 121 estimates the environmental information in the stop period of the location where the image forming apparatus 100A is installed, based on the environmental information acquired from the image forming apparatus 100B, the air conditioner 200, and the server apparatus 300. For example, the processor 121 performs the estimation as follows. In the following description, the temperature in the environmental information is described as an example. It is possible to estimate the environmental information other than the temperature similarly. The location where the image forming apparatus 100A is installed is an example of the measurement position.

Estimation Using the Temperature Acquired from the Image Forming Apparatus 100B

For example, regarding the temperature acquired from the image forming apparatus 100B, the processor 121 may use the acquired temperature without any change, as the image forming apparatus 100B is highly likely installed close to the image forming apparatus 100A. However, there is a possibility that the temperature becomes higher due to the heat generated by the image forming apparatus 100B. For this reason, the processor 121 may add a correction in such a manner that a temperature rise due to the heat generated by the image forming apparatus 100B is subtracted from the temperature acquired from the image forming apparatus 100B.

Estimation Using the Temperature Acquired from the Air Conditioner 200

For example, if the air conditioner 200 is installed in the same room or the same building as the image forming apparatus 100A, it is considered that the temperature acquired from the air conditioner 200 by the processor 121 is close to the temperature of the installation location of the image forming apparatus 100A. Therefore, the processor 121 may use the temperature acquired from the air conditioner 200 without any change. However, there is a possibility that the temperature measured by the air conditioner 200 changes depending on an operation state of the air conditioner 200 and heat insulation performance of the building or the room in which the air conditioner 200 is installed. Therefore, the processor 121 may correct the temperature acquired from the air conditioner 200 in consideration of these factors. For example, Table 2 shows an example of the relationship between the heat insulation performance of the location where the image forming apparatus 100A and the air conditioner 200 are installed and the time taken until the temperature of the location reaches a setting temperature of the air conditioner (air conditioner 200).

TABLE 2

| HEAT INSULATION PERFORMANCE OF INSTALLATION LOCATION | ELAPSED TIME UNTIL SETTING TEMPERATURE OF AIR CONDITIONER IS REACHED [MINUTE] |
|---|---|
| LOW | 120 MINUTES |
| MEDIUM | 60 MINUTES |
| HIGH | 30 MINUTES |

As shown in Table 2, the higher the heat insulation performance is, the shorter the time from the start of operation of the air conditioner until the temperature of the room reaches the set temperature of the air conditioner becomes. In other words, at the position of the image forming apparatus 100A, it is considered that a time difference with the temperature measured by a built-in thermometer of the air conditioner is generated. It is considered that the time difference is increased as a distance between the air conditioner and the image forming apparatus 100A becomes long. Therefore, for example, the processor 121 may estimate that as the distance between the image forming apparatus 100A and the air conditioner 200 becomes longer, more time is taken until the temperature of the location where the image forming apparatus 100A is installed reaches the temperature acquired from the air conditioner 200. The distance is input to the image forming apparatus 100A in advance, for example, by an administrator of the image forming apparatus 100A. For example, the processor 121 may estimate that as the heat insulation performance of the location where the image forming apparatus 100A is installed becomes lower, more time is taken until the temperature of the location where the image forming apparatus 100A is installed reaches the temperature acquired from the air conditioner 200. The heat insulation performance is input to the image forming apparatus 100A in advance, for example, by an administrator of the image forming apparatus 100A. Alternatively, the air conditioner 200 may have data relating to the heat insulation performance. The air conditioner 200 may have a function of measuring the heat insulation performance. The heat insulation performance may not be in three stages as described above. In addition, the heat insulation performance may be not shown stepwise as described above, and may be shown by a numerical value or the like.

Figure 4:
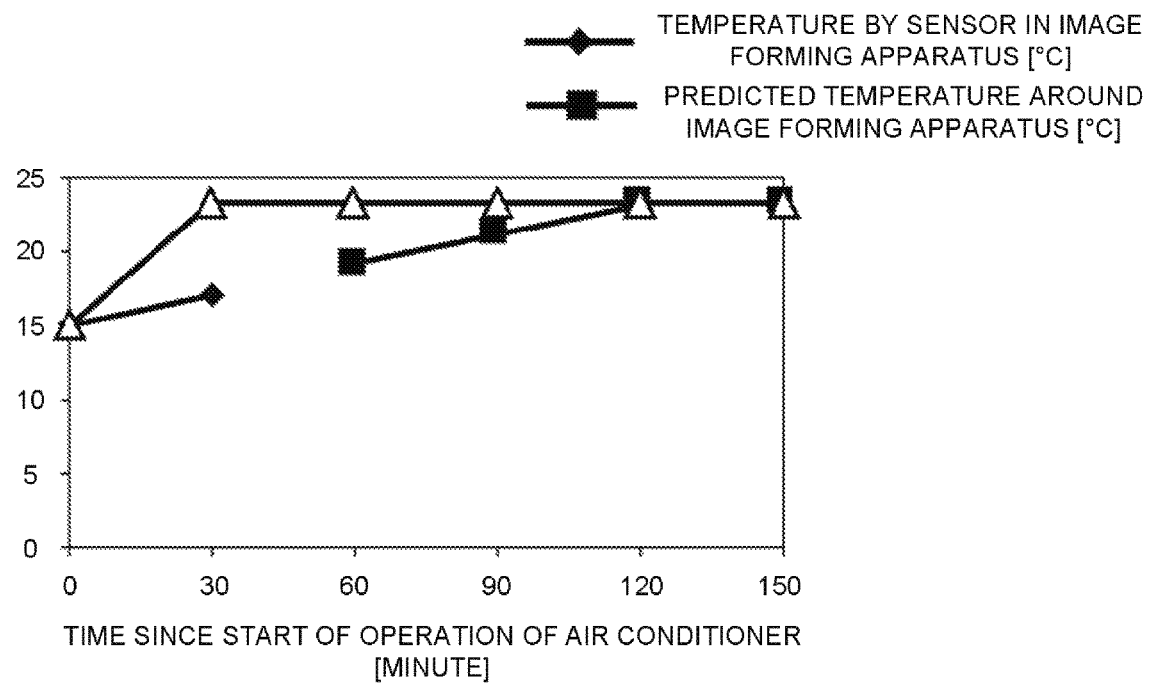
FIG. 4 is a graph illustrating an example of estimation of temperature.

For example, Table 3 shows examples of various temperatures at each time from 30 minutes before the power supply of the image forming apparatus 100A is turned off to 120 minutes after the power supply is turned off. This is shown in FIG. 4 as a graph. FIG. 4 is a graph illustrating an example of temperature estimation.

TABLE 3

| ELAPSED TIME SINCE IMAGE FORMING APPARATUS IS POWERED OFF [MINUTE] | TIME FROM START OF OPERATION OF AIR CONDITIONER [MINUTE] | MEASURED TEMPERATURE BY THERMOMETER IN IMAGE FORMING APPARATUS [° C.] | ESTIMATED TEMPERATURE AROUND IMAGE FORMING APPARATUS [° C.] | MEASURED TEMPERATURE BY THERMOMETER BUILT IN AIR CONDITIONER [° C.] | SETTING TEMPERATURE OF AIR CONDITIONER [° C.] |
|---|---|---|---|---|---|
| −30 | 0 | 15 | — | 15 | 23 |
| 0 | 30 | 17 | — | 23 | 23 |
| 30 | 60 | UNMEASURABLE | 19 | 23 | 23 |
| 60 | 90 | UNMEASURABLE | 21 | 23 | 23 |
| 90 | 120 | UNMEASURABLE | 23 | 23 | 23 |
| 120 | 150 | UNMEASURABLE | 23 | 23 | 23 |

Table 3 shows the following cases.

The operation of the air conditioner (air conditioner 200) is started 30 minutes before the power supply of the image forming apparatus 100A is turned off. The temperature cannot be measured by the thermometer 126 in the image forming apparatus 100A while the power supply is turned off. Therefore, the image forming apparatus 100A acquires the temperature in the period from the air conditioner. The temperature acquired here is the temperature measured by the thermometer built in the air conditioner. The processor 121 estimates a predicted temperature of the vicinity of the image forming apparatus 100A based on the temperature acquired from the air conditioner. With the thermometer built in the air conditioner, the temperature when the power supply of the image forming apparatus 100A is turned off is measured as 23 degrees centigrade. However, through the above estimation, the processor 121 estimates that the time when the temperature of the vicinity of the image forming apparatus 100A becomes 23 degrees centigrade is 90 minutes after the power supply of the image forming apparatus 100A is turned off.

Estimation Using the Temperature Acquired from the Image Forming Apparatus 100B or the Air Conditioner 200 and the Temperature Acquired from the Server Apparatus 300

Figure 5:
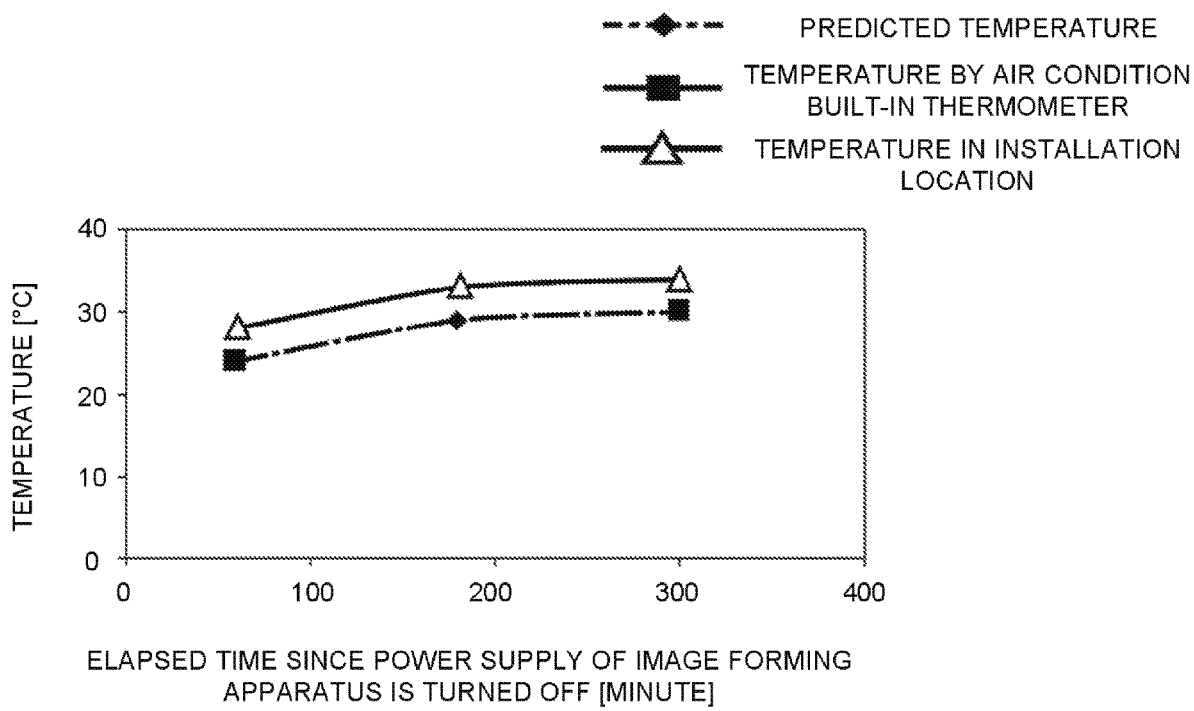
FIG. 5 is a graph illustrating an example of an estimated temperature using a temperature acquired from another image forming apparatus or an air conditioner and a temperature acquired from a server apparatus.

Table 4 and FIG. 5 show examples of temperatures acquired from the air conditioner (air conditioner 200), temperatures acquired from the server apparatus 300, and estimated temperatures using these temperatures.

TABLE 4

| ELAPSED TIME SINCE POWER OFF [MINUTE] | ESTIMATED TEMPERATURE [° C.] | MEASURED TEMPERATURE BY THERMOMETER BUILT IN AIR CONDITIONER [° C.] | TEMPERATURE OF INSTALLATION AREA [° C.] |
|---|---|---|---|
| 60 | 24 | 24 | 28 |
| 180 | 29 | UNMEASURABLE | 33 |
| 300 | 30 | 30 | 34 |

Table 4 shows the following cases.

The image forming apparatus 100A can acquire the temperatures 60 minutes and 300 minutes after the power supply is turned off from the air conditioner. However, the image forming apparatus 100A cannot acquire the temperature 180 minutes after the power supply is turned off. Then, the image forming apparatus 100A can acquire the temperatures 60 minutes, 180 minutes and 300 minutes after the power supply is turned off from the server apparatus 300.

The processor 121 estimates that the estimated temperatures of the location where the image forming apparatus 100A is installed 60 minutes and 300 minutes after the power supply is turned off are the same as those 60 minutes and 300 minutes after the power supply is turned off which are acquired from the air conditioner. The processor 121 estimates the temperature 180 minutes after the power supply is turned off when the temperature cannot be acquired from the air conditioner using the temperature acquired from the air conditioner and the temperature acquired from the server apparatus 300.

For example, the processor 121 estimates the temperature of the location where the image forming apparatus 100A is installed by assuming that the temperature acquired from the server apparatus 300 and the temperature of the location where the image forming apparatus 100A is installed change in the same manner. Alternatively, the processor 121 may estimate the temperature of the location where the image forming apparatus 100A is installed by considering that the indoor temperature change lags behind the outdoor temperature change.

The processor 121 may estimate the temperature of the location where the image forming apparatus 100A is installed by combining the above-described methods. The processor 121 may estimate the temperature of the location where the image forming apparatus 100A is installed by a method other than the above-described methods.

In Act 20, based on the environmental information estimated in Act 19, the processor 121 determines whether or not the environment such as the temperature, the humidity, the atmospheric pressure, or the like of the location where the image forming apparatus 100A is installed rapidly changes in the stop period. For example, the processor 121 determines that the environment rapidly changes if a period in which a magnitude of an average rate of change of the temperature, the humidity, the atmospheric pressure or the like is equal to or greater than a predetermined value is contained in the stop period. Alternatively, for example, the processor 121 may determine that the environment rapidly changes if a magnitude of a difference between the lowest temperature and the highest temperature in the stop period, a magnitude of a difference between the lowest humidity and the highest humidity, or a magnitude of a difference between the lowest atmospheric pressure and the highest atmospheric pressure is equal to or greater than a predetermined value. If it is determined that the environment does not change rapidly, the processor 121 determines No in Act 20 and terminates the processing shown in FIG. 3. On the other hand, if it is determined that the environment rapidly changes, the processor 121 determines Yes in Act 20 and proceeds to the processing in Act 21.

In Act 21, the processor 121 optimizes the operation of the image forming apparatus 100A in response to the change in the environment. For example, the processor 121 executes a color shift correction. For example, the processor 121 controls operations of a fan, a heater, and the like to prevent freezing and condensation. The processor 121 may perform the color shift correction particularly when the temperature rapidly changes. The color shift is a major factor that causes the change in the temperature. The optimization performed in Act 21 is an example of a maintenance operation.

In Act 22, the processor 121 determines whether or not the humidity of the location where the image forming apparatus 100A is installed rapidly changes in the stop period based on the environmental information estimated in Act 19. For example, the processor 121 determines that the humidity rapidly changes when a period in which the magnitude of the average rate of change of the humidity is equal to or greater than a predetermined value is contained in the stop period. Alternatively, for example, the processor 121 may determine that the humidity rapidly changes when the magnitude of the difference between the lowest humidity and the highest humidity in the stop period is equal to or greater than a predetermined value. If it is determined that the humidity does not change rapidly, the processor 121 determines No in Act 22 and terminates the processing shown in FIG. 3. If it is determined that the humidity rapidly changes, the processor 121 determines Yes in Act 22 and proceeds to the processing in Act 23.

In Act 23, the processor 121 implements a stabilization control of the developing device. In other words, for example, the processor 121 forcibly performs idle rotation of the developing device or changes to an optimum image forming condition while detecting an image density with a density sensor. The stabilization control of the developing device is an example of a maintenance operation.

In Act 24, the processor 121 determines whether or not the humidity of the location where the image forming apparatus 100A is installed sharply rises in the stop period based on the environmental information estimated in Act 19. For example, the processor 121 determines that the humidity rapidly changes when the period in which the average rate of change of the humidity is equal to or greater than a predetermined value is contained in the stop period. Alternatively, for example, the processor 121 may determine that the humidity rapidly changes when a value obtained by subtracting the lowest humidity from the highest humidity in the stop period is equal to or greater than a predetermined value. If it is determined that the humidity rapidly changes, there is a high possibility that the rainfall occurs in the stop period. Therefore, the processor 121 can determine whether or not the rainfall occurs through the above determination. If it is determined that the humidity does not rise sharply, the processor 121 determines No in Act 24 and terminates the processing shown in FIG. 3. On the other hand, if it is determined that the humidity rapidly rises, the processor 121 determines Yes in Act 24 and proceeds to the processing in Act 25.

In Act 25, the processor 121 controls operation for notifying the operator of the image forming apparatus 100A to urge the operator to confirm whether a sheet placed in the sheet feed tray 101 absorbs moisture, to urge the operator to replace the sheet placed in the sheet feed tray 101 with a sheet that does not absorb moisture, to urge the operator to use a sheet that is resistant to humidity change in printing, and to urge the operator to set the sheet on the manual feed tray 102 without using the sheet placed in the sheet feed tray 101, and the like. For example, the processor 121 generates an image containing the above-described notifying content. Then, the processor 121 instructs the touch panel of the control panel 115 to display the generated image. Upon receiving the instruction, the touch panel displays the image. For example, the processor 121 controls a speaker or the like to output the sound including the above-described notifying content or the sound for attracting attention of the operator of the image forming apparatus 100A. For example, the processor 121 performs control to enable an LED (Light-Emitting Diode) or the like to emit light to attract the attention of the operator of the image forming apparatus 100A. The processor 121 may display an image or the like containing the above-described notifying content on a PC (Personal Computer), a tablet PC, a smart phone or the like connected to the network NW1. The operation for notifying performed in Act 25 is an example of the maintenance operation.

In Act 26, the processor 121 determines whether or not a sheet jam prevention function is enabled. If the sheet jam prevention function is disabled, the processor 121 determines No in Act 26 and terminates the processing shown in FIG. 3. On the other hand, if the sheet jam prevention function is enabled, the processor 121 determines Yes in Act and proceeds to the processing in Act 27. Switching between the enabled state and the disable state of the sheet jam prevention function may be set by the operator or the administrator of the image forming apparatus 100A. The sheet jam prevention function may be enabled or disabled as a default value by a designer of the image forming apparatus 100A. The processor 121 may display a button for enabling or disabling the sheet jam prevention function on the touch panel in Act 26.

In Act 27, the processor 121 switches the sheet feed speed to a low speed by controlling the motor controller 130 and the like. After the processing in Act 27, the processor 121 terminates the processing shown in FIG. 3. Switching of the sheet feed speed is an example of the maintenance operation.

In the embodiment, the image forming apparatus 100A estimates the environmental information in the stop period of the location where the image forming apparatus 100A is installed based on the environmental information acquired from another apparatus after the termination of the operation stop state in which the environmental information cannot be measured by the thermometer 126 or the hygrometer 127. Therefore, the image forming apparatus 100A can perform the operation corresponding to the change even when the environmental information such as the temperature rapidly changes in the stop period. The image forming apparatus 100 can suppress the occurrence of failure by executing the above operation.

The image forming apparatus 100A of the embodiment acquires the environmental information from still another apparatus if the environmental information in the stop period cannot be acquired from another apparatus. As a result, the image forming apparatus 100A can more reliably acquire the environmental information as compared with a case in which the environmental information is acquired from only one apparatus. By acquiring the environmental information from a plurality of apparatuses, the image forming apparatus 100A can improve the estimation accuracy of the environmental information of the location where the image forming apparatus 100A is installed.

The image forming apparatus 100A of the embodiment may acquire the environmental information in the stop period from another image forming apparatus 100 (the image forming apparatus 100B) in some cases. It is considered that the image forming apparatus 100B is likely to be placed in an environment close to the image forming apparatus 100A. Therefore, the image forming apparatus 100A can improve the estimation accuracy of the environmental information using the environmental information acquired from the image forming apparatus 100B.

The image forming apparatus 100A of the embodiment may acquire the environmental information in the stop period from the air conditioner 200 in some cases. When the air conditioner 200 is installed in the same room as the image forming apparatus 100A, the air conditioner 200 records the temperature of the room where the image forming apparatus 100A is installed. Therefore, by acquiring the environmental information from the air conditioner 200, the image forming apparatus 100A can estimate the environmental information of the location where the image forming apparatus 100A is installed with high accuracy.

The image forming apparatus 100A of the embodiment may acquire the environmental information of the area where the image forming apparatus 100A is installed. The image forming apparatus 100A can estimate the environmental information of the location where the image forming apparatus 100A is installed by acquiring the environmental information of the area even if there is no apparatus which can acquire the environmental information except the server apparatus 300. By using the environmental information of the area, the image forming apparatus 100A can improve the estimation accuracy of the environmental information of the location where the image forming apparatus 100A is installed.

The image forming apparatus 100A of the embodiment estimates the environmental information of the location where the image forming apparatus 100A is installed using the heat insulation performance of the building in which the image forming apparatus 100A is installed. Therefore, the image forming apparatus 100A can estimate the environmental information of the location where the image forming apparatus 100A is installed with higher accuracy than a case of not using the heat insulation performance.

The image forming apparatus 100A of the embodiment may switch the sheet feed speed to the low speed when the humidity rapidly rises in some cases. The image forming apparatus 100A can prevent a sheet jam by switching the sheet feed speed to the low speed.

The above embodiment may also be modified as follows. In the above embodiment, the image forming apparatus 100A acquires the environmental information when the length of the stop period is equal to or greater than a threshold value T1. However, the image forming apparatus 100A may acquire the environmental information regardless of the length of the stop period. In this case, the processor 121 proceeds to the processing in Act 12 without executing the processing in Act 11, for example.

The image forming apparatus 100 of the embodiment stops measuring the environmental information such as the temperature and the humidity in the sleep mode. However, the image forming apparatus 100 may measure the environmental information even in the sleep mode. In the image forming apparatus 100 configured as described above, it is assumed that the sleep mode is not contained in the operation stop state, and a state in which the power supply is turned off is set as the operation stop state.

In Act 11, the processor 121 may use a period since the last measurement of the environmental information before the termination of the operation stop state, instead of the length of the stop period.

In the above embodiment, if it is determines that the environmental information corresponding to the entire stop period can be acquired, the image information apparatus 100A does not acquire the environmental information from the apparatus with the lower priority. However, even when it is determined that the environmental information corresponding to the entire stop period can be acquired, the image forming apparatus 100A may acquire the environmental information from the apparatus with the lower priority. Then, the image forming apparatus 100A may estimate the environmental information in the stop period of the location where the image forming apparatus 100A is installed using the environmental information acquired from a plurality of apparatuses.

If there is a plurality of the image forming apparatuses 100 on the network NW1, in the image forming system 1, one or more image forming apparatuses 100 may be set to a state in which the power supply thereof is turned on so that the measurement by the thermometer 126 can be performed. For example, a plurality of the image forming apparatuses 100 cooperatively performs the control for the above operation. By doing this, there is a high possibility that the image forming apparatus 100A can acquire temperature from the image forming apparatus 100 whose power supply is turned on for measurement by the thermometer 126. Therefore, the image forming apparatus 100A improves the estimation accuracy of the environmental information of the location where the image forming apparatus 100A is installed.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming system, comprising:
an image forming apparatus comprising:
a processor configured to:
measure first environmental information of a measurement position in a first period;
acquire first external environmental information measured by a first external device; and
estimate second environmental information of the measurement position in a second period different from the first period using the first external environmental information, and perform control to execute a maintenance operation based on the second environmental information, wherein
the processor further acquires the first external environmental information and second external environmental information measured by a second external device, and
if it is determined that the first external environmental information alone is insufficient to estimate the second environmental information, the processor estimates the second environmental information using the first external environmental information and the second external environmental information.

2. The image forming system according to claim 1, wherein
the first external device is another image forming apparatus.

3. The image forming system according to claim 1, wherein
at least one of the first external device and the second external device is an air conditioner or server.

4. The image forming system according to claim 1, wherein
the processor acquires environmental information of an area internal to the image forming apparatus as the first environmental information.

5. The image forming system according to claim 1, wherein
the processor acquires the environmental information of an area surrounding the image forming apparatus as the second environmental information.

6. The image forming system according to claim 1, wherein
the processor estimates the second environmental information using a heat insulation performance of a building containing the measurement position.

7. The image forming system according to claim 1, wherein
the first environmental information and the second environmental information include at least one of temperature and humidity.

8. The image forming system according to claim 1, wherein
the processor and first external device each comprise at least one of a thermometer and a hygrometer.

9. The image forming system according to claim 1, wherein
the processor is positioned inside the image forming apparatus.

10. The image forming system according to claim 1, wherein the processor is positioned in an area surrounding the image forming apparatus.

11. The image forming system according to claim 1, wherein
if the processor acquires the first environmental information in each certain period of time in the second period, the processor determines that the first external environmental information corresponding to a whole of the second period is acquired, if it is determined that the first external environmental information corresponding to the whole of the second period is not acquired, the processor estimates the second environmental information using the first external environmental information and the second external environmental information.

12. The image forming system according to claim 1, wherein
if a length of a period in which the first external environmental information is not acquired in the second period is equal to or shorter than a length of a certain period of time, the processor determines that the first external environmental information corresponding to a whole of the second period is acquired, if it is determined that the first external environmental information corresponding to the whole of the second period is not acquired, the processor estimates the second environmental information using the first external environmental information and the second external environmental information.

13. An image forming system, comprising:
an image forming apparatus comprising:
a processor configured to:
measure first environmental information of a measurement position in a first period;
acquire first external environmental information measured by a first external device; and
estimate second environmental information of the measurement position in a second period different from the first period using the first external environmental information, and perform control to execute a maintenance operation based on the second environmental information, wherein
the processor estimates the second environmental information using a distance from the image forming apparatus to the first external device.

14. A control method by an image forming apparatus, comprising:
measuring first environmental information of a measurement position in a first period;
acquiring first external environmental information measured by a first external device;
estimating second environmental information of the measurement position in a second period different from the first period using the first external environmental information, and performing control to execute a maintenance operation based on the second environmental information; and
estimating the second environmental information using a distance from the image forming apparatus to the first external device.

15. The method according to claim 14, further comprising:
acquiring the first external environmental information and second external environmental information measured by a second external device, and
if it is determined that the first external environmental information alone is insufficient to estimate the second environmental information, estimating the second environmental information using the first external environmental information and the second external environmental information.

16. The method according to claim 15, further comprising:
acquiring the environmental information of an area surrounding the image forming apparatus as the second environmental information.

17. The method according to claim 15, further comprising:
estimating the second environmental information using a heat insulation performance of a building containing the measurement position.

18. The method according to claim 14, further comprising:
acquiring environmental information of an area internal to the image forming apparatus as the first environmental information.

19. The method according to claim 14, wherein
the first environmental information and the second environmental information include at least one of temperature and humidity.

20. An image forming apparatus, comprising:
a processor configured to:
measure at least one of temperature and humidity of a measurement position in a first period;
receive at least one of a first external temperature and a first external humidity measured outside of the image forming apparatus;
estimate second environmental information of the measurement position in a second period different from the first period using at least one of the first external temperature and the first external humidity, and perform control to execute a maintenance operation on the image forming apparatus based on the second environmental information; and
estimating the second environmental information using a distance from the image forming apparatus to the measurement position.

* * * * *